(12) United States Patent
Imamura (10) Patent No.: US 9,870,772 B2
(45) Date of Patent: Jan. 16, 2018

(54) GUIDING DEVICE, GUIDING METHOD, PROGRAM, AND INFORMATION STORAGE MEDIUM

(71) Applicant: Sony Interactive Entertainment Inc., Tokyo (JP)

(72) Inventor: Kotaro Imamura, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/303,642

(22) PCT Filed: May 1, 2015

(86) PCT No.: PCT/JP2015/063064
§ 371 (c)(1),
(2) Date: Oct. 12, 2016

(87) PCT Pub. No.: WO2015/167008
PCT Pub. Date: Nov. 5, 2015

(65) Prior Publication Data
US 2017/0032782 A1    Feb. 2, 2017

(30) Foreign Application Priority Data

May 2, 2014 (JP) .................................. 2014-095233

(51) Int. Cl.
*G10L 15/00* (2013.01)
*G10L 15/20* (2006.01)
(Continued)

(52) U.S. Cl.
CPC ............... *G10L 15/20* (2013.01); *G06F 3/16* (2013.01); *G10L 15/22* (2013.01); *G10L 25/03* (2013.01);
(Continued)

(58) Field of Classification Search
CPC ............................... G10L 15/01; G10L 15/22
(Continued)

(56) References Cited

U.S. PATENT DOCUMENTS 6,338,036 B1    1/2002    Miyazawa
6,947,892 B1*   9/2005    Bauer ..................... G10L 15/05
                                                              704/233
(Continued)

FOREIGN PATENT DOCUMENTS

JP         06236196 A     8/1994
JP       2000081891 A     3/2000
(Continued)

OTHER PUBLICATIONS

International Preliminary Report on Patentability and Written Opinion for corresponding PCT Application No. PCT/JP2015/063064, 11 pages, dated Nov. 17, 2016.
(Continued)

*Primary Examiner* — Daniel Abebe
(74) *Attorney, Agent, or Firm* — Matthew B. Dernier, Esq.

(57) ABSTRACT

A guiding device, a guiding method, a program, and an information storage medium are provided which can perform output control of a guidance related to a volume at which to input voice using the recognition ranking of a received voice. A voice receiving section (46) receives a voice. When given information is identified as a result of recognition of the voice, an output control section (58) performs control so as to output a guidance related to a volume at which to input voice in a mode corresponding to the recognition ranking of the information.

8 Claims, 8 Drawing Sheets

(51) Int. Cl.
  *G06F 3/16*      (2006.01)
  *G10L 15/22*     (2006.01)
  *G10L 25/48*     (2013.01)
  *G10L 25/03*     (2013.01)

(52) U.S. Cl.
  CPC ........ *G10L 25/48* (2013.01); *G10L 2015/223* (2013.01)

(58) Field of Classification Search
  USPC .......................................................... 704/233
  See application file for complete search history.

(56) References Cited

U.S. PATENT DOCUMENTS

| | | | |
|---|---|---|---|
| 7,167,544 B1* | 1/2007 | Bauer | G10L 15/22 |
| | | | 379/88.01 |
| 9,047,857 B1* | 6/2015 | Barton | G10L 15/22 |
| 2006/0047509 A1* | 3/2006 | Ding | G10L 15/24 |
| | | | 704/231 |
| 2007/0225975 A1* | 9/2007 | Imoto | G10L 15/065 |
| | | | 704/233 |
| 2008/0167868 A1 | 7/2008 | Kanevsky | |
| 2012/0089392 A1 | 4/2012 | Larco | |
| 2013/0021362 A1 | 1/2013 | Sakurada | |
| 2014/0257799 A1* | 9/2014 | Shepard | H03G 3/3005 |
| | | | 704/206 |

FOREIGN PATENT DOCUMENTS

| | | |
|---|---|---|
| JP | 2000322078 A | 11/2000 |
| JP | 2001042891 A | 2/2001 |
| JP | 2003148987 A | 5/2003 |
| JP | 2006227499 A | 8/2006 |

OTHER PUBLICATIONS

International Search Report for corresponding PCT Application No. PCT/JP2015/063064, 4 pages, dated Jul. 21, 2015.
Office Action for corresponding JP Application No. 2016-516421, 6 pages, dated Jul. 25, 2017.
European Search Report for corresponding EP Application No. 15785826.7, 10 pages, dated Dec. 7, 2017.
"Samsung series 8 [8000] user manual". Retrieved from the Internet: URL:http://download.sears.comjdocsjspin pr pd 807917512.pdf, 63 pages (Oct. 11, 2012).

* cited by examiner

| CONDITION RELATED TO VOLUME | RECOGNITION RANKING | | NAME OF PROCESSING |
|---|---|---|---|
| | FIRST PLACE | SECOND PLACE | |
| SNR>5dB | MAGIC WORD | | (1) CHANGE TO VOICE RECOGNITION STATE |
| SNR≦5dB | MAGIC WORD | | (1) CHANGE TO VOICE RECOGNITION STATE<br>(2) DISPLAY GUIDANCE |
| | N/A | MAGIC WORD | (1) DISPLAY GUIDANCE |

GUIDING DEVICE, GUIDING METHOD, PROGRAM, AND INFORMATION STORAGE MEDIUM

TECHNICAL FIELD

The present invention relates to a guiding device, a guiding method, a program, and an information storage medium.

BACKGROUND ART

There is a voice recognition technology in which a plurality of pieces of information ranked by an index such as likelihood or the like are identified as results of recognition of received voices. In such a voice recognition technology, when the volume of input voice is too low, accuracy of voice recognition is lowered due to the effect of environmental sound. The accuracy of voice recognition is lowered also when the volume of input voice is too high. Then, when the accuracy of voice recognition is low, information that a user desires to make recognized is identified as a result of recognition having a low recognition ranking, or is not identified as a result of recognition. Therefore, in order for information desired to be recognized to be identified as a result of recognition having a high recognition ranking, the user needs to input voice at a volume at which to perform the input.

SUMMARY

Technical Problems

For example when a guidance related to the volume at which to input voice such as "SPEAKING IN LOUDER VOICE WILL FACILITATE VOICE RECOGNITION" or the like is output in a case where the volume of input voice is low, the user can grasp the volume at which to input voice.

Here, suppose for example that the guidance is output in a mode corresponding to the recognition ranking of given information such as a magic word or the like input by voice by the user. Then, because the lower the accuracy of voice recognition, the lower the recognition ranking of the information, as described above, the user can realize the accuracy of voice recognition with the output mode of the guidance as a clue, and can consequently grasp the volume at which to input voice more accurately. However, conventional technologies do not use the recognition ranking of the given information for output control of the guidance related to the volume at which to input voice.

The present invention has been made in view of the above problems. It is one of the objects of the present invention to provide a guiding device, a guiding method, a program, and an information storage medium that can perform output control of a guidance related to a volume at which to input voice using the recognition ranking of a received voice.

Solution to Problems

In order to solve the above problems, according to the present invention, there is provided a guiding device including: a receiving section configured to receive a voice; and an output control section configured to, when given information is identified as a result of recognition of the voice, perform control so as to output a guidance related to a volume at which to input voice in a mode corresponding to a recognition ranking of the information.

In addition, according to the present invention, there is provided another guiding device including: a receiving section configured to receive a voice; a state changing section configured to, when given information is identified as a result of recognition of the voice, change from a normal state not allowing input of a predetermined command by voice to a voice recognition state allowing input of the command by voice; and an output control section configured to perform control so as to output, after the change, a guidance related to a volume at which to input voice, the guidance corresponding to volume of the recognized voice.

In addition, according to the present invention, there is provided a guiding method including: a step of receiving a voice; and a step of, when given information is identified as a result of recognition of the voice, performing control so as to output a guidance related to a volume at which to input voice in a mode corresponding to a recognition ranking of the information.

In addition, according to the present invention, there is provided a program for making a computer perform: a step of receiving a voice; and a step of, when predetermined information is identified as a result of recognition of the voice, performing control so as to output a guidance related to a volume at which to input voice in a mode corresponding to a recognition ranking of the information.

In addition, according to the present invention, there is provided a computer readable information storage medium storing a program for making a computer perform: a step of receiving a voice; and a step of, when given information is identified as a result of recognition of the voice, performing control so as to output a guidance related to a volume at which to input voice in a mode corresponding to a recognition ranking of the information.

In one mode of the present invention, the guiding device further includes a state changing section configured to change to a voice recognition state allowing input of a predetermined command by voice when the given information is identified as a result of recognition of the voice received in a normal state not allowing input of the command by voice and the recognition ranking of the information is a first place, wherein the output control section performs control so as to output the guidance after the change to the voice recognition state.

In this mode, the output control section may perform control so as to output the guidance while remaining in the normal state when the given information is identified as a result of recognition of the voice received in the normal state and the recognition ranking of the information is other than the first place.

In addition, in one mode of the present invention, the output control section performs control so as to output the guidance only when a condition that volume of the recognized voice be lower than a predetermined volume is further satisfied.

DESCRIPTION OF EMBODIMENT

One embodiment of the present invention will hereinafter be described in detail with reference to the drawings.

Figure 1:
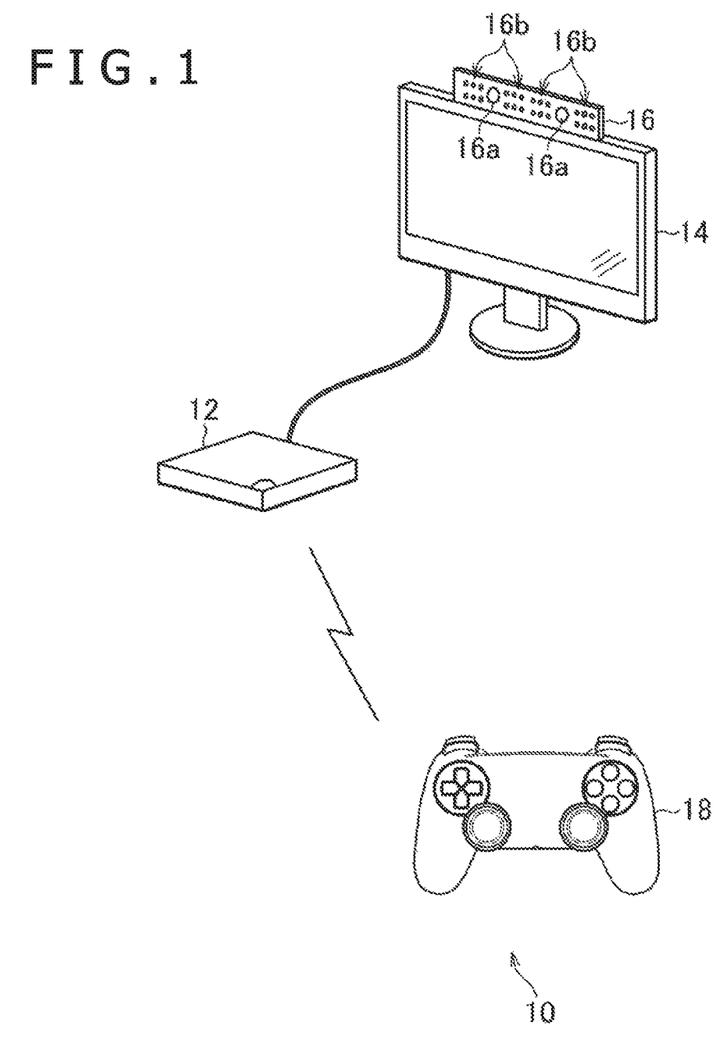
FIG. 1 is a diagram depicting an example of general configuration of an information processing system according to one embodiment of the present invention.

FIG. 1 is a diagram depicting an example of general configuration of an information processing system 10 according to one embodiment of the present invention. As depicted in FIG. 1, the information processing system 10 according to the present embodiment includes an information processing device 12, a display 14, a camera and microphone unit 16, and a controller 18.

Figure 2:
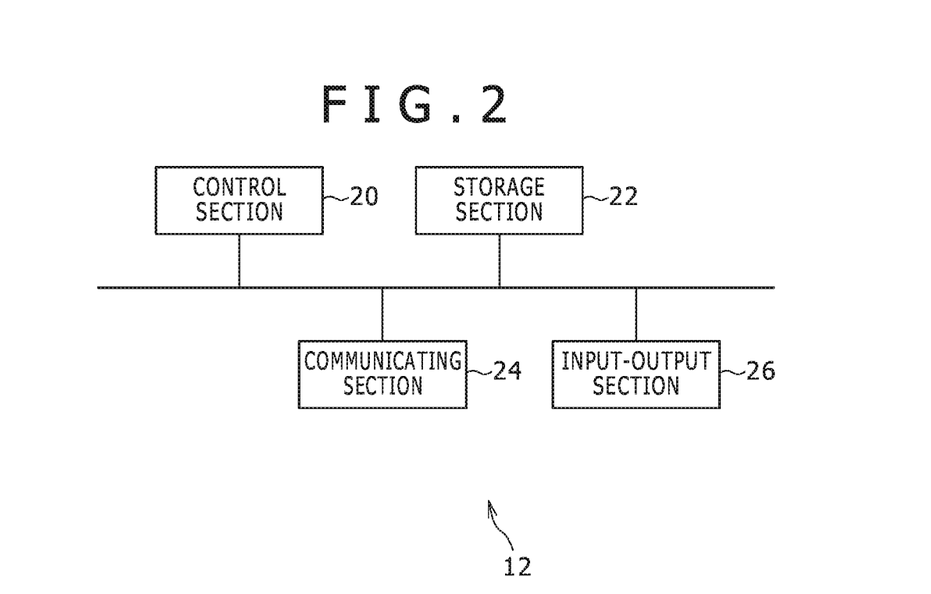
FIG. 2 is a diagram depicting an example of hardware configuration of an information processing device according to the embodiment of the present invention.

The information processing device 12 according to the present embodiment is for example a computer of an entertainment device such as a game console or the like. As depicted in FIG. 2, for example, the information processing device 12 includes a control section 20, a storage section 22, a communicating section 24, and an input-output section 26. The control section 20 is for example a program control device such as a CPU (Central Processing Unit) or the like that operates according to a program installed on the information processing device 12. The storage section 22 is for example a storage element such as a ROM (Read Only Memory) or a RAM (Random Access Memory), a hard disk drive, or the like. The storage section 22 stores the program executed by the control section 20 or the like. The communicating section 24 is for example a communication interface such as a network board, a wireless LAN (Local Area Network) module, or the like. The input-output section 26 is an input-output port such as an HDMI (registered trademark) (High-Definition Multimedia Interface) port, a USB (Universal Serial Bus) port, or the like.

The display 14 according to the present embodiment is a liquid crystal display or the like. The display 14 displays a screen generated by the information processing device 12 or the like. The display 14 according to the present embodiment also has a speaker that outputs sound represented by audio data generated by the information processing device 12. The camera and microphone unit 16 according to the present embodiment includes for example: a camera 16a that outputs an image obtained by imaging a subject to the information processing device 12; and a microphone 16b that obtains ambient sound, converts the sound into audio data, and outputs the audio data to the information processing device 12.

The information processing device 12 and the display 14 are for example connected to each other via an AV (Audio Visual) cable, an HDMI cable, or the like. The information processing device 12 and the camera and microphone unit 16 are for example connected to each other via a USB cable, an AV cable, an HDMI (registered trademark) (High-Definition Multimedia Interface) cable, or the like.

The controller 18 according to the present embodiment is an operating input device for performing operating input to the information processing device 12. The controller 18 according to the present embodiment is provided with operating elements such for example as buttons, a touch panel, operating sticks, and the like. The controller 18 according to the present embodiment also includes a sensor such as a gyro sensor that detects angular velocity, an acceleration sensor that detects acceleration, or the like.

The controller 18 according to the present embodiment also has a jack. Inserting a plug provided to a microphone into the jack enables audio input by the microphone. The controller 18 converts audio input to the microphone inserted in the controller 18 into audio data, and outputs the audio data to the information processing device 12.

In the present embodiment, when a user inputs voice to the microphone 16b included in the camera and microphone unit 16, the information processing device 12 recognizes the voice, and performs various kinds of processing according to a result of recognition of the voice. The user in the present embodiment can thus operate the information processing device 12 by voice. Incidentally, in the present embodiment, when the plug of the microphone is inserted in the jack of the controller 18, the result of recognition of the voice input to the microphone is handled with higher priority than a result of recognition of voice input to the microphone 16b included in the camera and microphone unit 16.

In addition, the user can perform various kinds of operating input using the controller 18 by depressing the buttons or inclining the operating sticks. Then, in the present embodiment, the controller 18 outputs input data associated with the operating input to the information processing device 12.

The controller 18 according to the present embodiment also includes a USB port. When the controller 18 is connected to the information processing device 12 by a USB cable, the controller 18 can output input data to the information processing device 12 by wire via the input-output section 26. The controller 18 according to the present embodiment also includes a radio communication module or the like. The controller 18 can therefore also output input data to the information processing device 12 by radio via the communicating section 24.

In addition, a publicly known voice recognition engine is installed on the information processing device 12 according to the present embodiment. Then, the voice recognition engine identifies a plurality of pieces of information ranked by an index such as likelihood or the like as results of recognition of voice input to the information processing device 12, that is, voice received by the information processing device 12. Incidentally, in the present embodiment, there can be a case where there is no information identified as a recognition result having a certain recognition ranking, or specifically, for example, there is no information corresponding to a recognition result whose recognition ranking is a first place.

In addition, the voice recognition engine can determine the relative magnitude of the volume of sound recognized as the voice of the user by the information processing device 12 on the basis of the input voice. Specifically, in the present embodiment, the information processing device 12 can for example determine a ratio of the volume of an ambient noise, that is, a sound recognized as an environmental sound to the volume of a sound recognized as the voice of the user by the information processing device 12. The thus identified ratio will hereinafter be referred to as an SNR (Signal-to-Noise Ratio).

In addition, the information processing device 12 according to the present embodiment performs various kinds of processing in an execution state that is either a normal state not allowing the input of a predetermined command by voice or a voice recognition state allowing the input of a predetermined command by voice. Then, the user can change the execution state of the information processing device 12 as appropriate.

Figure 3:
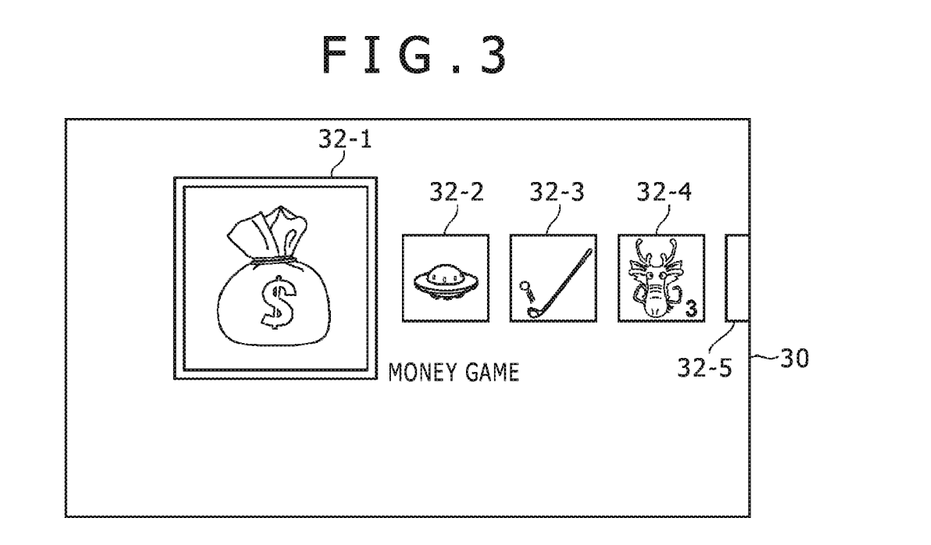
FIG. 3 is a diagram depicting an example of a home screen.

FIG. 3 is a diagram depicting an example of a home screen 30 displayed on the display 14 according to the present embodiment. In the present embodiment, the user can select one of programs installed on the information processing device 12 on the home screen 30.

As depicted in FIG. 3, program icon images 32 (program icon images 32-1 to 32-5 in the example of FIG. 3) associated with respective programs are arranged on the home screen 30 in an initial state. The program icon images 32 of at least part of the programs installed on the information processing device 12 are arranged on the home screen 30 depicted in FIG. 3. Then, one of the program icon images 32, or the program icon image 32-1 in the example of FIG. 3 is depicted in a selected state. In the present embodiment, the program icon image 32-1 in the selected state is displayed in a mode different from that of the other program icon images 32. The option in the selected state will hereinafter be referred to as an option of interest. In the above-described example, the program icon image 32-1 is the option of interest.

In the present embodiment, as depicted in FIG. 3, a character string representing the name of a program associated with the program icon image 32-1 is disposed at the lower right of the program icon image 32-1 as the option of interest. In addition, the program icon image 32-1 as the option of interest is highlighted as compared with the other program icon images 32 (32-2 to 32-5). Specifically, for example, the program icon image 32-1 has a larger size than the other program icon images 32 (32-2 to 32-5), and a frame is disposed on the periphery of the program icon image 32-1. In the present embodiment, the above indicates that the program icon image 32-1 is in a selected state, that is, that the program icon image 32-1 is the option of interest. It is to be noted that a method of indicating that the program icon image 32 is the option of interest is not limited to that depicted in FIG. 3.

Here, suppose that a predetermined time, for example ten seconds, has elapsed since the display of the home screen 30 depicted in FIG. 3. Then, the home screen 30 displayed on the display 14 is changed to a state depicted in FIG. 4. The home screen 30 then switches between the state depicted in FIG. 4 and a state depicted in FIG. 5 at predetermined time intervals, for example intervals of three seconds. In the state depicted in FIG. 4, a controller operation guidance image 34 is disposed on the home screen 30. Operation guidance information OI notifying descriptions of operations by the controller 18 is disposed in the controller operation guidance image 34. Meanwhile, a magic word guidance image 36 is disposed on the home screen 30 in the state depicted in FIG. 5. Magic word guidance information MI prompting for voice input of given information indicating a voice for starting voice recognition is disposed in the magic word guidance image 36. Then, the magic word guidance information MI includes the given information indicating the voice for starting voice recognition. FIG. 5 depicts a phrase "START VOICE RECOGNITION" as an example of the given information. The given phrase indicating the voice for starting voice recognition will hereinafter be referred to as a magic word MW.

Thus, in the present embodiment, after the passage of the predetermined time since the display of the home screen 30, the user is notified about both of the operation to be performed by the controller 18 and the voice to be input. Incidentally, in the present embodiment, when the user cannot perform voice input, the home screen 30 is not changed to the state in which the magic word guidance image 36 is disposed on the home screen 30. For example, when the camera and microphone unit 16 is not connected to the information processing device 12, nor is the plug of the microphone inserted in the jack of the controller 18, the home screen 30 is not changed to the state in which the magic word guidance image 36 is disposed on the home screen 30.

Figure 4:
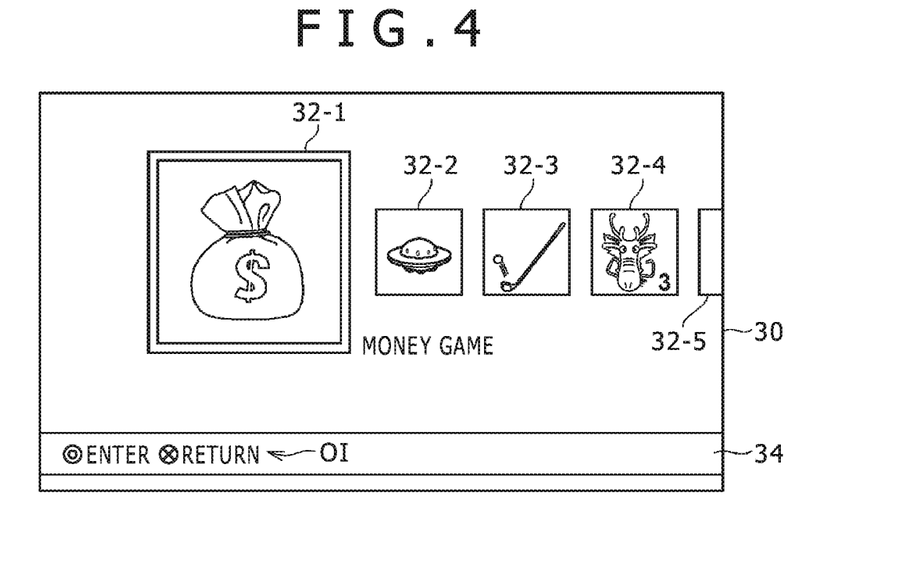
FIG. 4 is a diagram depicting an example of the home screen.
Figure 5:
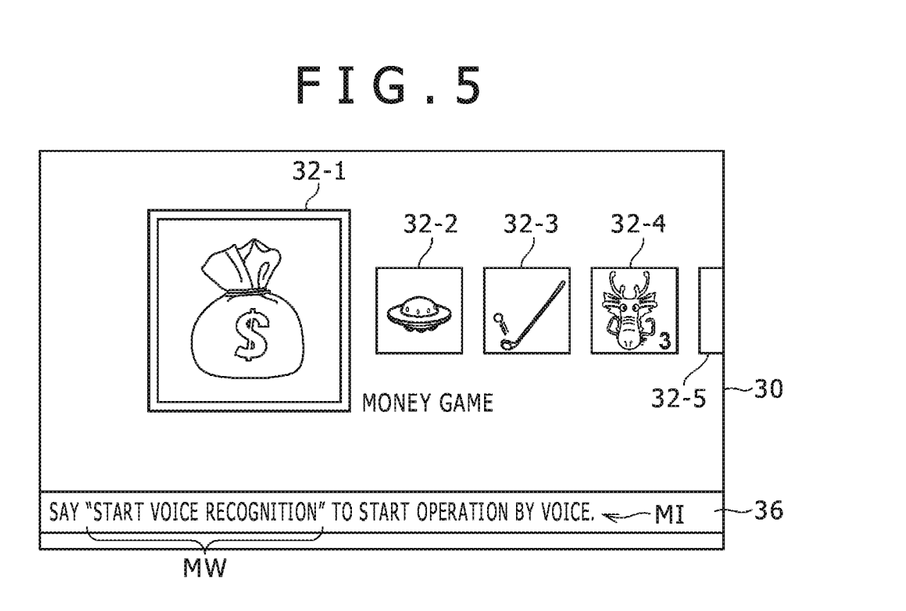
FIG. 5 is a diagram depicting an example of the home screen.

While the home screen 30 is in the state depicted in FIG. 3, FIG. 4, or FIG. 5, the execution state of the information processing device 12 according to the present embodiment is the normal state. Then, suppose that the information processing device 12 receives a voice of the user while the displayed home screen 30 is in the state depicted in FIG. 3, FIG. 4, or FIG. 5. In this case, in the present embodiment, according to ranking-processing relation data depicted in FIG. 6, processing is performed which processing corresponds to a combination of the value of the SNR identified on the basis of the voice and the recognition ranking of the magic word MW identified on the basis of the sound recognized as the voice of the user. The ranking-processing relation data depicted in FIG. 6 indicates relation between the recognition rankings of predetermined information such as the magic word MW or the like and the names of processing to be performed. Incidentally, in the ranking-processing relation data according to the present embodiment, combinations between conditions related to the volume and the recognition rankings of the predetermined information are managed in association with the names of processing to be performed. More specifically, for example, combinations between conditions related to the value of the SNR identified on the basis of received voice and the recognition rankings of the magic word MW are managed in association with the names of processing to be performed.

For example, when the value of the identified SNR is larger than a predetermined value L1 (for example larger than 5 dB in this case), and a recognition result whose recognition ranking is the first place is the magic word MW (for example "START VOICE RECOGNITION" in this case), the execution state of the information processing device 12 is changed to the voice recognition state. In this case, the home screen 30 switches to a state depicted in FIG. 7.

In addition, for example, when the value of the identified SNR is equal to or smaller than the above-described predetermined value L1, and the recognition result whose recognition ranking is the first place is the magic word MW, the execution state of the information processing device 12 is changed to the voice recognition state, and a guidance related to a volume at which to input voice is displayed. In this case, the home screen 30 switches to a state depicted in FIG. 8.

In addition, for example, when the value of the identified SNR is equal to or smaller than the above-described predetermined value L1, there is no information corresponding to a recognition result whose recognition ranking is the first place, and a recognition result whose recognition ranking is a second place is the magic word MW, the guidance related to the volume at which to input voice is output. In this case, the execution state of the information processing device 12 remains the normal state. In this case, the home screen 30 switches to a state depicted in FIG. 9.

Figure 7:
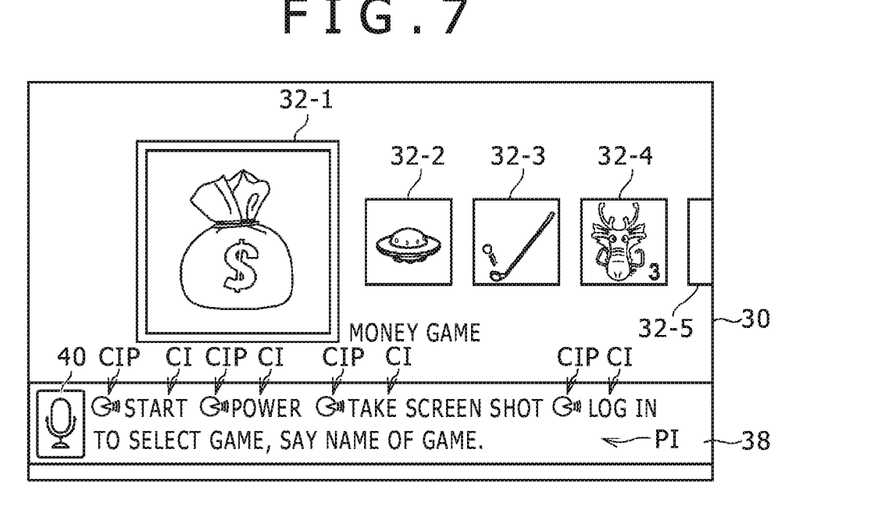
FIG. 7 is a diagram depicting an example of the home screen.
Figure 8:
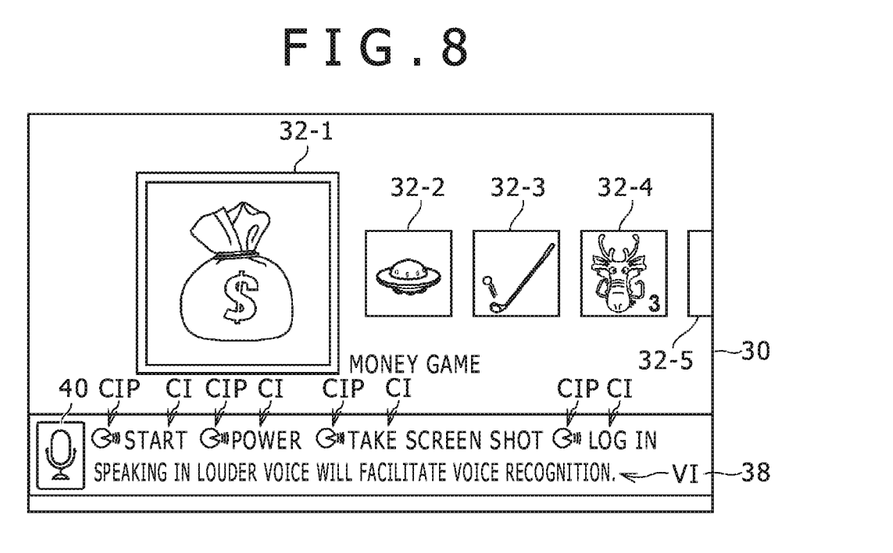
FIG. 8 is a diagram depicting an example of the home screen.

When the execution state of the information processing device 12 is the voice recognition state, as depicted in FIG. 7 and FIG. 8, a voice input guidance image 38 for notifying the user of a voice to be input in performing voice input of a command is disposed on the home screen 30.

In the present embodiment, when the user inputs a voice while the execution state of the information processing device 12 is the voice recognition state, the information processing device 12 recognizes information represented by the voice, and identifies a command indicated by the voice on the basis of a result of the recognition. The information processing device 12 then performs processing corresponding to the command.

At least one piece of command information CI indicating a command is disposed in the voice input guidance image 38 illustrated in FIG. 7 and FIG. 8. In the present embodiment, a phrase indicating a command is disposed as command information CI. Incidentally, other information such as an icon image symbolizing the command or the like may be disposed as the command information CI in place of the phrase.

The command information CI is associated with the command that can be received by the information processing device 12. Then, in the present embodiment, when the user inputs a voice indicated by the command information CI, processing corresponding to the command associated with the command information CI is performed.

Four pieces of command information CI are arranged on the home screen 30 illustrated in FIG. 7 and FIG. 8. In the present embodiment, command distinguishing images CIP are disposed on the left side of the command information CI arranged on the home screen 30. Then, the command distinguishing images CIP enable the user to recognize that processing corresponding to a command associated with command information CI on the right side of a command distinguishing image OP will be performed by inputting a voice indicated by the command information CI.

Here, suppose for example that the home screen 30 depicted in FIG. 7 or FIG. 8 is displayed on the display 14. In this case, when the information processing device 12 receives a voice representing a phrase "START," the execution of the program associated with the program icon image 32 as the option of interest is started. In addition, when the information processing device 12 receives a voice representing a phrase "POWER," a screen allowing control to be performed to turn off power to the information processing device 12 is displayed on the display 14. In addition, when the information processing device 12 receives a voice representing a phrase "TAKE SCREEN SHOT," a capture image obtained by capturing display contents on the home screen 30 as a still image is stored in the storage section 22 of the information processing device 12. In addition, when the information processing device 12 receives a voice representing a phrase "LOG IN," a screen depicting a list of users is displayed on the display 14. The user then logs in by performing voice input of an identifier of the user registered in the information processing device 12 on the screen.

In addition, in the present embodiment, an operating element such as a button of the controller 18 or the like is assigned to a command indicated by command information CI. Then, processing corresponding to the command associated with the button is performed by depressing the button. Thus, in the present embodiment, processing corresponding to a command indicated by command information CI can be performed both by operating an operating element and by voice input.

In addition, in the present embodiment, a displayed program icon image 32 is associated with at least one piece of information such as a name, an abbreviated name, a popular name, or the like of a program associated with the program icon image 32. In addition, in the present embodiment, program name input guidance information PI prompting for voice input of the name of a program such as a game or the like is disposed in the voice input guidance image 38 depicted in FIG. 7 and FIG. 8. Then, in the present embodiment, when the user performs voice input of a voice representing the name of a program or the like, the program icon image 32 associated with the program is identified as the option of interest. In this case, when the input voice represents the name of a plurality of programs or the like, a program icon image 32 associated with one of the plurality of programs is identified as the option of interest. In the present embodiment, when the information processing device 12 receives a voice representing a phrase "dragon game" while the home screen 30 depicted in FIG. 7 is displayed, the program icon image 32-4 is identified as the option of interest. Then, in the present embodiment, the displayed home screen 30 is updated so as to highlight the program icon image 32-4.

Incidentally, in the voice recognition state, a command corresponding to a received voice may be identified when the volume of the received voice is within a predetermined volume range. In this case, a lower limit of the predetermined volume range may be higher than the above-described predetermined volume L1.

In the present embodiment, on the home screen 30 depicted in FIG. 8, volume guidance information VI as the guidance related to the volume at which to input voice in the present embodiment is disposed in the voice input guidance image 38 in place of the program name input guidance information PI depicted in FIG. 7. In this case, for example, as the volume guidance information VI, which is a guidance prompting the user to perform input in a louder voice, a character string "SPEAKING IN LOUDER VOICE WILL FACILITATE VOICE RECOGNITION" is disposed in the voice input guidance image 38.

Thus, in the present embodiment, the volume guidance information VI may be displayed in timing in which the execution state of the information processing device 12 is changed from the normal state to the voice recognition state. However, in the present embodiment, excluding the timing, the volume guidance information VI is not displayed in the case where the execution state of the information processing device 12 is the voice recognition state even when the value of the SNR identified on the basis of a received voice is equal to or smaller than the predetermined value L1.

Figure 9:
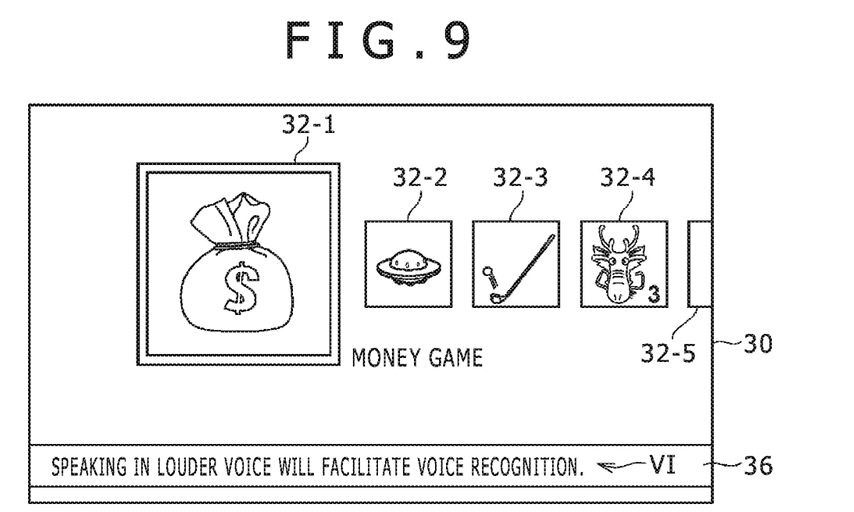
FIG. 9 is a diagram depicting an example of the home screen.

In addition, on the home screen 30 depicted in FIG. 9, the above-described volume guidance information VI is disposed in place of the magic word guidance information MI depicted in FIG. 5.

As described above, in the present embodiment, the guidance related to the volume at which to input voice is output in a mode corresponding to the recognition ranking of the given information such as the magic word MW or the like identified as a result of voice recognition. Specifically, for example, when the recognition ranking of the given information such as the magic word MW or the like is the first place, the above-described volume guidance information VI is disposed within the voice input guidance image 38 displayed when the execution state of the information processing device 12 is the voice recognition state. Besides, when the recognition ranking of the given information such as the magic word MW or the like is the second place, the above-described volume guidance information VI is disposed within the magic word guidance image 36 displayed when the execution state of the information processing device 12 is the normal state.

With an ordinary voice recognition technology, when the volume of an input voice is too low, accuracy of voice recognition is lowered due to the effect of environmental sound. Then, the lower the accuracy of voice recognition, the lower the recognition ranking of information that the user desires to make recognized. Therefore, when the guidance related to the volume at which to input voice is output in the mode corresponding to the recognition ranking of the given information identified as a result of voice recognition as in the present embodiment, the user can realize the accuracy of voice recognition with the output mode of the guidance as a clue. As a result, the user can grasp the volume at which to input voice more accurately.

In addition, as described above, in the present embodiment, when the volume of a recognized voice of the user is relatively low as compared with the volume of ambient noise, that is, environmental sound, the guidance prompting the user to perform input in a louder voice is output. Incidentally, the accuracy of voice recognition is lowered also when the volume of input voice is too high. Accordingly, for example, when the volume of a recognized voice is higher than a predetermined volume, a guidance related to a volume at which to input voice may be output in the mode corresponding to the recognition ranking of the given information such as the magic word MW or the like identified as a result of voice recognition. In this case, for example, a character string "SPEAKING IN LOWER VOICE WILL FACILITATE VOICE RECOGNITION" may be displayed as the guidance prompting the user to perform input in a lower voice. In addition, the guidance related to the volume at which to input voice may be output in the mode corresponding to the recognition ranking of the given information such as the magic word MW or the like identified as a result of voice recognition irrespective of the volume of the recognized voice.

In addition, the guidance related to the volume at which to input voice may be output by voice. Here, suppose for example that the value of the SNR identified on the basis of an input voice is equal to or smaller than the predetermined value L1. In this case, for example, when the recognition ranking of the given information such as the magic word MW or the like is the first place, the execution state of the information processing device 12 may be changed to the voice recognition state, and a voice representing contents "SPEAKING IN LOUDER VOICE WILL FACILITATE VOICE RECOGNITION" may be output by voice. When the recognition ranking of the given information such as the magic word MW or the like is the second place, on the other hand, the voice representing the contents "SPEAKING IN LOUDER VOICE WILL FACILITATE VOICE RECOGNITION" may be output by voice with the execution state of the information processing device 12 remaining the normal state.

In addition, in the present embodiment, the execution state of the information processing device 12 is changed to the voice recognition state also when an operation of depressing a predetermined operating element is performed while the home screen 30 is in the state depicted in FIG. 3, FIG. 4, or FIG. 5. In this case, the home screen 30 switches to the state depicted in FIG. 7. The present embodiment thus enables the execution state of the information processing device 12 to be changed to the voice recognition state both by performing the operation using the controller 18 and by performing voice input of the magic word MW.

Then, in the present embodiment, when a predetermined time, for example ten seconds, has passed in a state of neither an operation using the controller 18 nor voice input being performed since the execution state of the information processing device 12 was changed to the voice recognition state, the execution state of the information processing device 12 is changed to the normal state. In addition, also when an operation using the controller 18 is performed after the execution state of the information processing device 12 is changed to the voice recognition state, the execution state of the information processing device 12 is similarly changed to the normal state. When the execution state of the information processing device 12 is changed to the normal state in the case where the home screen 30 depicted in FIG. 7 or FIG. 8 is displayed on the display 14, the displayed home screen 30 is changed to the home screen depicted in FIG. 5.

In addition, suppose that a predetermined time, for example five seconds, has passed in the state of neither an operation using the controller 18 nor voice input being performed since the display of the home screen 30 in the voice recognition state which home screen is depicted in FIG. 8. In this case, the home screen 30 may be updated to the home screen 30 depicted in FIG. 7 on which home screen the volume guidance information VI is not disposed. In addition, suppose that a predetermined time, for example five seconds, has passed in the state of neither an operation using the controller 18 nor voice input being performed since the display of the home screen 30 in the normal state which home screen is depicted in FIG. 9. In this case, the home screen 30 may be updated to the home screen 30 depicted in FIG. 5 on which home screen the volume guidance information VI is not disposed.

Incidentally, while the information processing device 12 is in the voice recognition state, the volume of sound output from the speaker may be controlled to be low.

In addition, the information processing device 12 according to the present embodiment may be capable of recognizing voices indicated by the above-described command information CI when the execution state of the information processing device 12 is the normal state. Here, suppose for example that the information processing device 12 receives a voice of the user while the displayed home screen 30 is in the state depicted in FIG. 3, FIG. 4, or FIG. 5. Then, suppose that the value of the SNR identified on the basis of the voice is equal to or smaller than the predetermined value L1. In this case, when a recognition result whose recognition ranking is the first place is one piece of the above-described command information CI, and a recognition result whose recognition ranking is the second place is the magic word MW, the home screen 30 may be switched to the state depicted in FIG. 8. Here, of course, the home screen 30 may be switched to the state depicted in FIG. 8 also when there is no information corresponding to a recognition result whose recognition ranking is the first place, and a recognition result whose recognition ranking is the second place is the magic word MW. In addition, the home screen 30 may be switched to the state depicted in FIG. 8 also when the recognition ranking of the magic word MW is a third place or lower.

Control of the changing of the execution state of the information processing device 12 and control of the display of the volume guidance information VI will be further described in the following.

Figure 10:
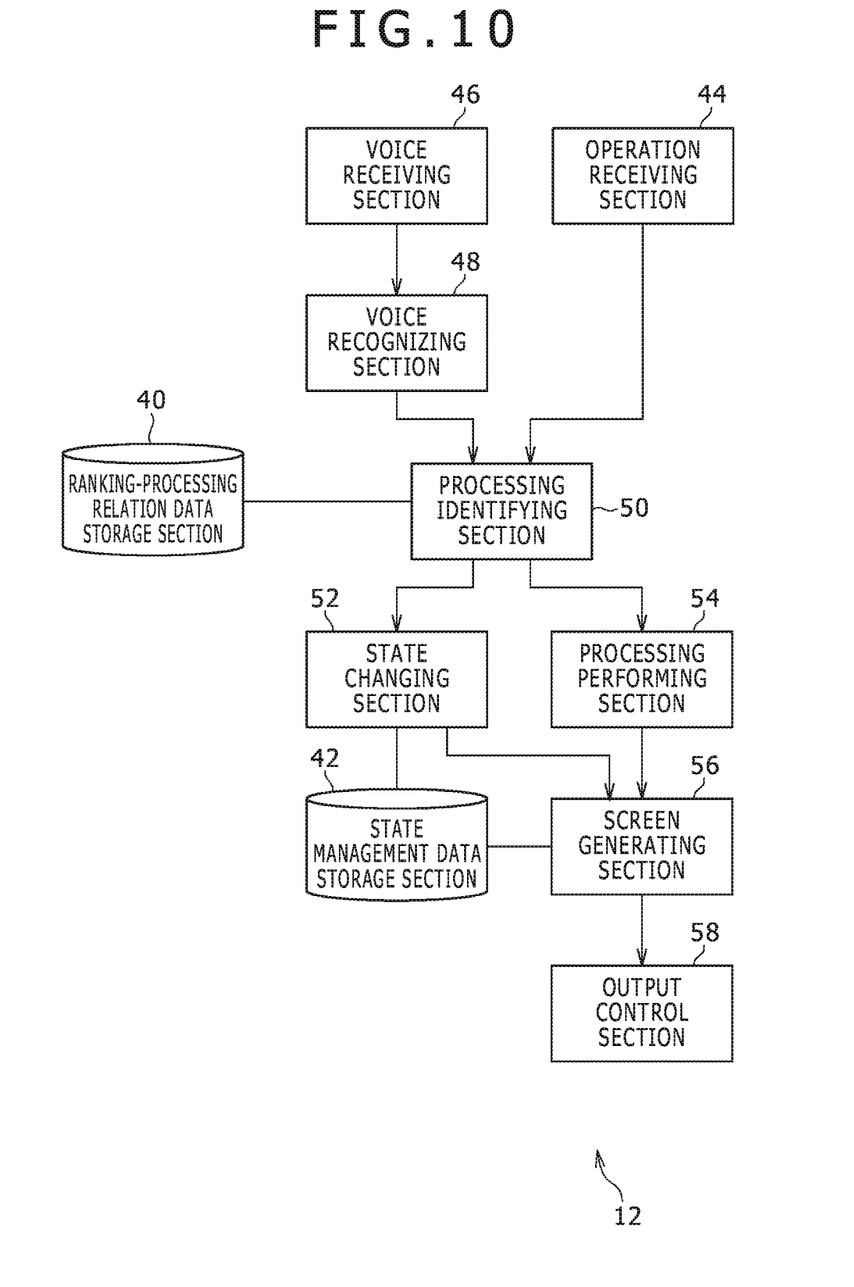
FIG. 10 is a functional block diagram depicting an example of functions implemented in the information processing device according to the embodiment of the present invention.

FIG. 10 is a functional block diagram depicting an example of functions related to the control of the changing of the execution state of the information processing device 12 and the control of the display of the volume guidance information VI, the functions being implemented in the information processing device 12 according to the present embodiment. It is to be noted that the information processing device 12 according to the present embodiment does not need to implement all of the functions depicted in FIG. 10, and that the information processing device 12 according to the present embodiment may implement functions other than the functions depicted in FIG. 10.

As depicted in FIG. 10, the information processing device 12 according to the present embodiment functionally includes for example a ranking-processing relation data storage section 40, a state management data storage section 42, an operation receiving section 44, a voice receiving section 46, a voice recognizing section 48, a processing identifying section 50, a state changing section 52, a processing performing section 54, a screen generating section 56, and an output control section 58. The ranking-processing relation data storage section 40 and the state management data storage section 42 are implemented mainly in the storage section 22. The operation receiving section 44 is implemented mainly in the communicating section 24 or the input-output section 26. The voice receiving section 46 is implemented mainly in the input-output section 26. The output control section 58 is implemented mainly in the input-output section 26. The other functions are implemented mainly in the control section 20. Incidentally, the voice recognizing section 48 corresponds to functions implemented in the above-described voice recognition engine.

Then, the above functions are implemented by executing, in the control section 20, a program including commands corresponding to the above functions, the program being installed on the information processing device 12 as a computer. This program is for example supplied to the information processing device 12 via a computer readable information storage medium such as an optical disk, a magnetic disk, a magnetic tape, a magneto-optical disk, a flash memory, or the like or via communicating means such as the Internet or the like.

Figure 6:
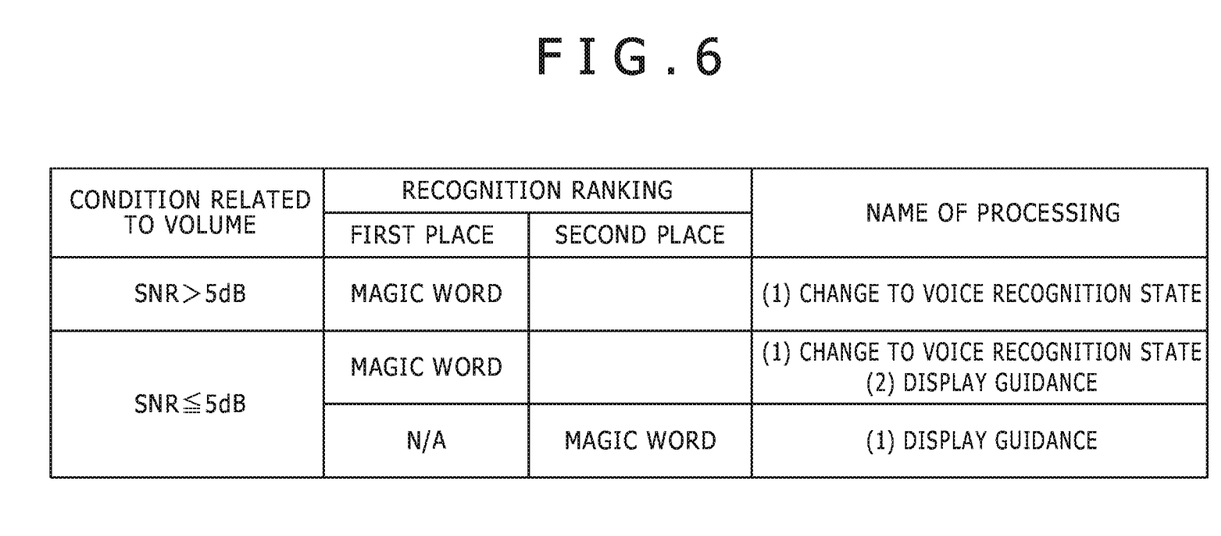
FIG. 6 is a diagram depicting an example of ranking-processing relation data.

The ranking-processing relation data storage section 40 stores the ranking-processing relation data illustrated in FIG. 6.

The state management data storage section 42 stores state management data managing the execution state of the information processing device 12. Suppose in the present embodiment that the state management data assumes a value of either the "normal state" or the "voice recognition state."

The operation receiving section 44 receives an operation on the controller 18. The operation receiving section 44 in the present embodiment for example receives a signal indicating a depressed button or the like.

The voice receiving section 46 receives a voice. The voice receiving section 46 in the present embodiment for example receives a voice input to the microphone 16b by the user.

The voice recognizing section 48 recognizes the voice received by the voice receiving section 46. The voice recognizing section 48 in the present embodiment identifies at least one piece of information ranked by an index such as likelihood or the like as a result of recognition of the voice received by the voice receiving section 46. Incidentally, as described above, in the present embodiment, there can be a case where there is no information identified as a result of recognition having a certain recognition ranking, or specifically, for example, there is no information corresponding to a recognition result whose recognition ranking is the first place. The voice recognizing section 48 also identifies the relative magnitude of the volume of sound recognized as the voice of the user by the information processing device 12 on the basis of the voice received by the voice receiving section 46. The voice recognizing section 48 in the present embodiment for example identifies the value of the above-described SNR.

The processing identifying section 50 identifies processing to be performed. The processing identifying section 50 in the present embodiment for example identifies the name of processing to be performed on the basis of the ranking-processing relation data stored in the ranking-processing relation data storage section 40, the value of the SNR identified by the voice recognizing section 48, and the information identified as a result of recognition by the voice recognizing section 48. In addition, the processing identifying section 50 in the present embodiment for example identifies processing corresponding to a command associated with command information CI described above on the basis of a result of recognition by the voice recognizing section 48 or an operation received by the operation receiving section 44.

The state changing section 52 changes the execution state of the information processing device 12. In the present embodiment, the state changing section 52 changes the value of the state management data stored in the state management data storage section 42 on the basis of a result of recognition by the voice recognizing section 48 or an operation received by the operation receiving section 44. The state changing section 52 for example changes the execution state of the information processing device 12 to the voice recognition state when the given information such as the magic word MW or the like is identified as a result of recognition of a voice received while the execution state of the information processing device 12 is the normal state. In this case, for example, the value of the state management data may be changed to the "voice recognition state" when the given information such as the magic word MW or the like has a predetermined ranking, for example the first place.

When the processing identifying section 50 identifies processing corresponding to a command associated with command information CI described above, the processing performing section 54 performs the processing.

The screen generating section 56 generates data representing a screen such as the home screen 30 or the like. In the present embodiment, the screen generating section 56 generates the data representing the screen at a predetermined frame rate. In addition, the screen generating section 56 generates the data representing the screen on the basis of the value of the SNR identified by the voice recognizing section 48, the value of the state management data stored in the state management data storage section 42, a result of performing the processing by the processing performing section 54, and the like.

When the given information such as the magic word MW or the like is identified as a result of recognition of the voice recognized by the voice recognizing section 48, the output control section 58 performs control to output the guidance related to the volume at which to input voice in the mode corresponding to the recognition ranking of the information. Suppose for example that the given information is identified as a result of recognition of a voice received while the execution state of the information processing device 12 is the normal state, and that the recognition ranking of the information is the first place. In this case, the output control section 58 according to the present embodiment performs control so as to output the guidance related to the volume at which to input voice after the execution state of the information processing device 12 is changed from the normal state to the voice recognition state. In addition, suppose for example that the given information is identified as a result of recognition of a voice received while the execution state of the information processing device 12 is the normal state, and that the recognition ranking of the information is other than the first place. In this case, the output control section 58 according to the present embodiment performs control so as to output the guidance related to the volume at which to input voice with the execution state of the information processing device 12 remaining the normal state. Incidentally, as described above, the output control section 58 may perform control so as to output the guidance related to the volume at which to input voice only when a condition that the volume of the recognized voice be lower than a predetermined volume is satisfied. In addition, the output control section 58 in the present embodiment performs control so as to output the screen generated by the screen generating section 56. Incidentally, in the present embodiment, for example, each time the screen generating section 56 generates the data representing the screen at the predetermined frame rate, the output control section 58 outputs the data representing the screen to the display 14. The display 14 then displays the screen corresponding to the data. Thus, in the present embodiment, the screen is displayed on the display 14 at the predetermined frame rate. The output control section 58 may also perform control so as to output, by voice, the guidance related to the volume at which to input voice.

Incidentally, when the given information is identified as a result of recognition of the received voice, the screen generating section 56 may generate the data representing the screen on which the volume guidance information VI corresponding to the volume of the recognized voice is disposed after the execution state of the information processing device 12 is changed to the voice recognition state. In this case, the output control section 58 performs control so as to output the guidance related to the volume at which to input voice, the guidance corresponding to the volume of the recognized voice, after the change in the execution state of the information processing device 12.

Figure 11:
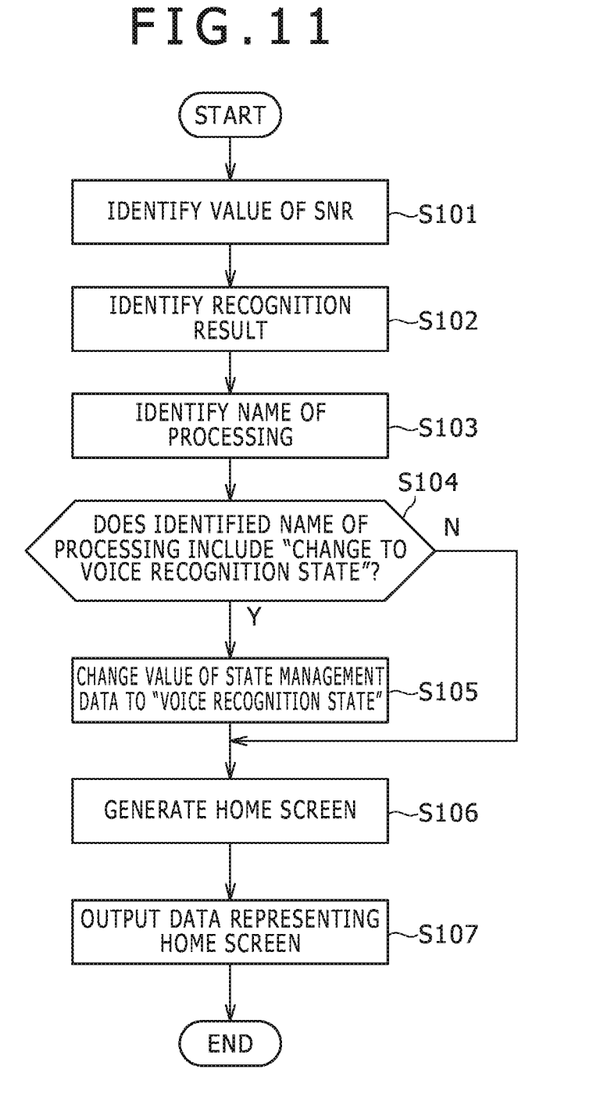
FIG. 11 is a flowchart depicting an example of a flow of processing performed in the information processing device according to the present embodiment.

Referring to a flowchart of FIG. 11, description in the following will be made of an example of a flow of processing performed in the information processing device 12 according to the present embodiment when the voice receiving section 46 receives a voice while the home screen 30 is in the state depicted in FIG. 3, FIG. 4, or FIG. 5. In this situation, the execution state of the information processing device 12 is the normal state, and therefore the value of the state management data stored in the state management data storage section 42 is the "normal state."

The voice recognizing section 48 first identifies the value of the SNR on the basis of the voice received by the voice receiving section 46 (S101). The voice recognizing section 48 then identifies at least one piece of ranked information as a result of recognition on the basis of the voice received by the voice receiving section 46 (S102).

The processing identifying section 50 then identifies the name of processing to be performed on the basis of the ranking-processing relation data stored in the ranking-processing relation data storage section 40, the value of the SNR identified in the processing depicted in S101, and the information identified in the processing depicted in S102 (S103).

Here, suppose for example that the value of the SNR identified in the processing depicted in S101 is larger than 5 dB, and that the magic word MW is identified as a result of recognition having the recognition ranking of the first place in the processing depicted in S102. In this case, "change to voice recognition state" is identified as the name of processing to be performed. In addition, suppose for example that the value of the SNR identified in the processing depicted in S101 is equal to or less than 5 dB, and that the magic word MW is identified as a result of recognition having the recognition ranking of the first place in the processing depicted in S102. In this case, two names "change to voice recognition state" and "display guidance" are identified as the names of processing to be performed. In addition, suppose for example that the value of the SNR identified in the processing depicted in S101 is equal to or less than 5 dB, that there is no information corresponding to a recognition result whose the recognition ranking is the first place in the processing depicted in S102, and that the magic word MW is identified as a result of recognition having the recognition ranking of the second place. In this case, "display guidance" is identified as the name of processing to be performed.

Then, the state changing section 52 checks whether or not "change to voice recognition state" is included as the name of processing which name is identified in the processing depicted in S103 (S104). When determining that "change to voice recognition state" is included (S104: Y), the state changing section 52 changes the value of the state management data stored in the state management data storage section 42 to the "voice recognition state" (S105).

When it is determined in the processing depicted in S104 that "change to voice recognition state" is not included as the name of processing which name is identified in the processing depicted in S103 (S104: N), or when the processing depicted in S105 is ended, the screen generating section 56 generates the home screen 30 (S106). In the processing depicted in S106, the screen generating section 56 generates the home screen 30 on the basis of the value of the state management data stored in the state management data storage section 42 and whether or not "display guidance" is included as the name of processing which name is identified in the processing depicted in S103. For example, when the value of the state management data stored in the state management data storage section 42 is the "voice recognition state," the home screen 30 on which the voice input guidance image 38 is disposed is generated. When the value of the state management data stored in the state management data storage section 42 is the "normal state," on the other hand, the home screen 30 on which the magic word guidance image 36 is disposed is generated. In addition, when "display guidance" is included as the name of processing which name is identified in the processing depicted in S103, the home screen 30 on which the volume guidance information VI is disposed is generated. Incidentally, in the present processing example, suppose that when none of the above conditions are satisfied, the screen generating section 56 generates an identical screen to the screen being displayed in the processing depicted in S106.

Then, the output control section 58 outputs data representing the home screen 30 generated in the processing depicted in S106 to the display 14 (S107). The processing depicted in the present processing example is then ended. The display 14 displays the screen corresponding to the data.

Incidentally, as described above, for example audio data representing the voice of the guidance related to the volume at which to input voice may be output to the display 14 in the processing depicted in S107. In this case, the display 14 outputs the voice represented by the audio data. Incidentally, in this case, the screen generating section 56 may generate the home screen 30 on which the volume guidance information VI is not disposed in the processing depicted in S106.

It is to be noted that the present invention is not limited to the foregoing embodiment.

For example, the information processing device 12 may be a portable game device provided with the camera 16a and the microphone 16b. In addition, the information processing device 12 may be a personal computer, a tablet terminal, a smart phone, or the like. In addition, the allocation of the roles to the information processing device 12, the display 14, and the camera and microphone unit 16 is not limited to the above-described allocation. In addition, the information processing device 12 may be constituted of a plurality of casings.

In addition, the above concrete character strings and the concrete character strings in the drawings are illustrative, and are not limited to these character strings.

The invention claimed is:

1. A guiding device comprising:
a receiving section configured to receive user voice commands from a user;
a state changing section configured to maintain a normal state in which no user voice commands are responded to, except a predetermined special user voice command, which when received by the receiving section causes a change from the normal state to a voice recognition state in which a set of user voice commands are responded to;
a voice command monitoring section configured to determine whether respective magnitudes of the user voice commands are: (i) below, at, or above a first level, (ii) below, at, or above a second level, and (iii) below, at, or above a third level; and
an output control section configured to perform control in response to the user voice commands, and so as to output guidance to the user related to the respective magnitudes of the user voice commands, wherein:
when in the normal state, the output control section provides guidance to the user to increase the magnitude of the user voice command when the respective magnitude of the predetermined special user voice command is at or below the first level, and
when in the voice recognition state, the output control section provides guidance to the user to increase the magnitude of the user voice command when the respective magnitude of the predetermined special user voice command is at or below the second level, where the second level is higher than the first level.

2. The guiding device according to claim 1, wherein:
the receiving section is configured to determine possible recognition results based on analysis of the user voice commands, where the recognition results include: (i) recognition results in a first place category, indicating a relatively high likelihood of accurate recognition, and (ii) recognition results in a second place category, indicating a relatively lower likelihood of accurate recognition as compared to the recognition results in the first place category; and
the state changing section is configured to change from the normal state to the voice recognition state when the recognition results indicate the predetermined special user voice command were received in the first place category.

3. The guiding device according to claim 2, wherein the state changing section does not change from the normal state to the voice recognition state when the recognition results indicate the predetermined special user voice command were received in the second place category.

4. The guiding device according to claim 3, wherein the output control section provides guidance to the user to increase the magnitude of the user voice command when the respective magnitude of the predetermined special user voice command is at or below the first level.

5. The guiding device according to claim 1, wherein at least one of:
when in the normal state, the output control section does not provide any guidance when the respective magnitude of the predetermined special user voice command is above the first level;
when in the voice recognition state, the output control section does not provide any guidance when the respective magnitudes of the user voice commands are above the second level and at or below the third level, where the third level is higher than the second level; and
when in the voice recognition state, the output control section provides guidance to the user to increase the magnitude of the user voice command when the respective magnitude of the predetermined special user voice command is above the third level, where the third level is higher than the second level.

6. A guiding device comprising:
a receiving section configured to receive user voice commands from a user, and to determine possible recognition results based on analysis of the user voice commands, where the recognition results include: (i) recognition results in a first place category, indicating a relatively high likelihood of accurate recognition, and (ii) recognition results in a second place category, indicating a relatively lower likelihood of accurate recognition as compared to the recognition results in the first place category;
a state changing section configured to maintain a normal state in which no user voice commands are responded to, except a predetermined special user voice command, which when received by the receiving section causes a change from the normal state to a voice recognition state in which a set of user voice commands are responded to;
a voice command monitoring section configured to determine whether respective magnitudes of the user voice commands are above, at, or below a threshold level; and
an output control section configured to perform control in response to the user voice commands, and so as to output guidance to the user related to the respective magnitudes of the user voice commands, wherein:
the state changing section is configured to change from the normal state to the voice recognition state when the recognition results indicate the predetermined special user voice command were received in the first place category, and
when in the normal state, the output control section does not provide any guidance when the respective magnitude of the predetermined special user voice command is above the threshold level.

7. A guiding method comprising:
receiving user voice commands from a user via a receiving section;
maintaining, via a state changing section, a normal state in which no user voice commands are responded to, except a predetermined special user voice command, which when received by the receiving section causes a change from the normal state to a voice recognition state in which a set of user voice commands are responded to;

determining, via a voice command monitoring section, whether respective magnitudes of the user voice commands are: (i) below, at, or above a first level, (ii) below, at, or above a second level, and (iii) below, at, or above a third level; and performing control, via an output control section, in response to the user voice commands, and so as to output guidance to the user related to the respective magnitudes of the user voice commands, wherein:

when in the normal state, the output control section provides guidance to the user to increase the magnitude of the user voice command when the respective magnitude of the predetermined special user voice command is at or below the first level, and when in the voice recognition state, the output control section provides guidance to the user to increase the magnitude of the user voice command when the respective magnitude of the predetermined special user voice command is at or below the second level, where the second level is higher than the first level.

8. A non-transitory, computer readable recording medium containing a computer program, which when executed by a computer, causes the computer to perform actions, comprising:

receiving user voice commands from a user via a receiving section;

maintaining, via a state changing section, a normal state in which no user voice commands are responded to, except a predetermined special user voice command, which when received by the receiving section causes a change from the normal state to a voice recognition state in which a set of user voice commands are responded to;

determining, via a voice command monitoring section, whether respective magnitudes of the user voice commands are: (i) below, at, or above a first level, (ii) below, at, or above a second level, and (iii) below, at, or above a third level; and performing control, via an output control section, in response to the user voice commands, and so as to output guidance to the user related to the respective magnitudes of the user voice commands, wherein:

when in the normal state, the output control section provides guidance to the user to increase the magnitude of the user voice command when the respective magnitude of the predetermined special user voice command is at or below the first level, and when in the voice recognition state, the output control section provides guidance to the user to increase the magnitude of the user voice command when the respective magnitude of the predetermined special user voice command is at or below the second level, where the second level is higher than the first level.

* * * * *